Nov. 15, 1966   A. E. FEIN ETAL   3,286,107
THERMIONIC ENERGY CONVERTER
Filed Nov. 8, 1962
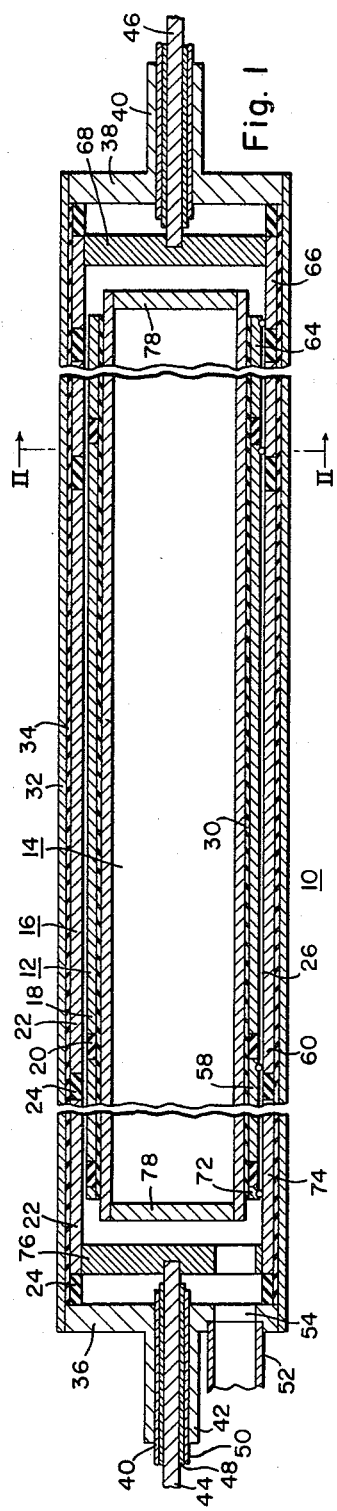
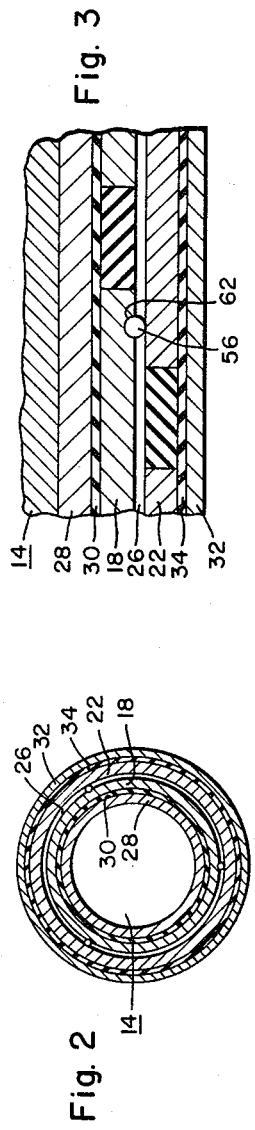
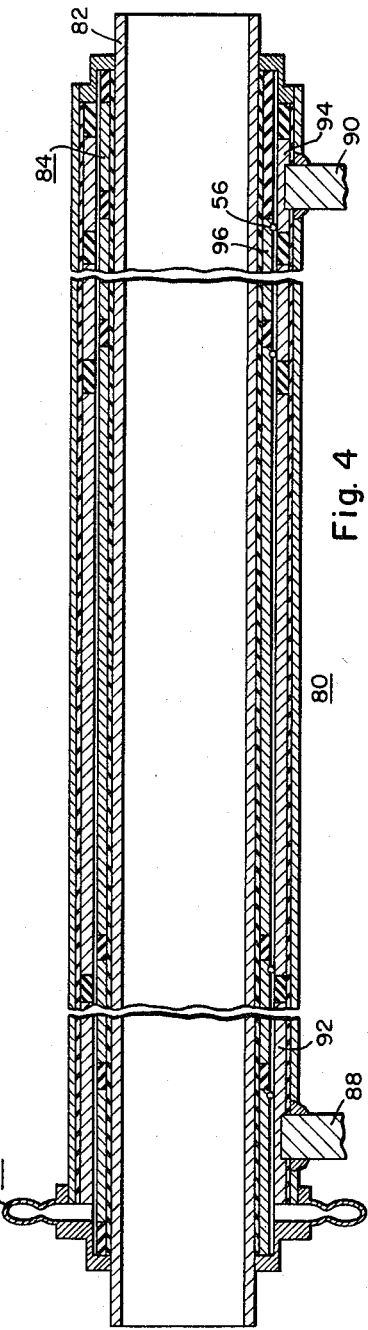

United States Patent Office 3,286,107
Patented Nov. 15, 1966

3,286,107
THERMIONIC ENERGY CONVERTER
Alvin E. Fein, Baltimore, Md., and George A. Kemeny, Franklin Township, Westmoreland County, and Lee S. Richardson, Monroeville, Pa., assignors to Westinghouse Electric Corporation, Pittsburgh, Pa., a corporation of Pennsylvania
Filed Nov. 8, 1962, Ser. No. 236,356
9 Claims. (Cl. 310—4)

The present invention relates to thermionic energy converters and manufacturing methods therefor and more particularly to thermionic nuclear fuel elements and methods for manufacturing the same.

Various modes of direct energy conversion are practicable and one of these is from heat to electricity through the use of the well known thermionic phenomena. In accordance with this phenomena, electrons subjected to energy in excess of the work function level are emitted into surrounding space from the surface of a highly heated metallic and electron emissive body or from an emissive coating on such surface. In practice, a thermionic energy conversion device employs a heated emissive body as a cathode which is located in proximity to a cooled anode. The emitted and energized electrons are then transported from the cathode to the cooled anode to form an electric current, and relatively good operational efficiency can be obtained if electron space charge and its accompanying restrctive electric gradient are minimized or eliminated all together. Further, with some limitations, thermionic efficiency is also directly dependent upon the temperature differential between the cathode and the anode.

Electron space charge in the interelectrode space can be minimized or eliminated through the injection of a vaporized alkaline metal such as cesium in that space. If the pressure of the metal vapor is sufficient, the metal atoms are ionized positively through contact with the hot cathode surface and the resulting ions undergo movement to the device region with greatest negative or electron charge and thereby substantially neutralize the latter charge. The metallic vapor also retards cathode evaporation. Additional information on thermionic energy converters and the reduction of space charge therein can be obtained by reference to U.S. Patent 2,980,819 issued to G. R. Feaster on July 1, 1958, entitled "Thermal Energy Converter" and assigned to the present assignee.

One notable consideration encountered in developing thermionic energy conversion devices or diodes for use as an electric generator is the fact that the voltage developed across the anode and cathode is usually relatively low, perhaps as low as one or two volts or less. To obtain higher generated voltages, it is therefore necessary to connect a plurality of thermionic diodes in series. A series system such as this can be obtained by connecting a plurality of separate thermionic devices together, but in many applications this is neither feasible nor efficient because of the nature of the source from which the thermionic cathodes are to be heated, and therefore a plurality of thermionic diodes are desirably incorporated in series circuit relation in a single thermionic energy conversion device.

Considering the case where a plurality of thermionic diodes are embodied in a single thermionic device for the reason just denoted, it is necessary that good mechanical support and accurate spacing be provided for the anode and cathode relative to each other in each diode. Further, it is necessary that heat transfer from the cathode to the anode be held at a relatively low value so as to enable efficient diode and device operation to be maintained at the desired anode-cathode temperature differential and simultaneously that electrically conductive connections be established between anodes and cathodes of electrically successive diodes.

If the thermionic device is elongated, then it is convenient in many applications to have respective hollow cathodes of the plural thermionic diodes occupy successive but spaced longitudinal segments of the device and be otherwise located laterally inwardly of the device (or radially inwardly of the device if the device cross section is circular and if the cathodes are generally in the form of hollow cylinders). Respective longitudinally-spaced hollow anodes of thermionic diodes are then disposed outwardly of the cathodes and suitably electrically connected thereto so as to establish the series thermionic electrical circuit previously described. Cathode heating can then be provided by suitable means within the cathode hollow and anode cooling can be provided by suitable means outwardly of the anodes. In some applications, of course, it may be desirable to reverse the cathode-anode geometry, namely to dispose the cathode laterally outwardly of the anode and correspondingly to interchange the location of the heating cooling means.

When nuclear fuel material is used as a heat source for a thermionic device, it is then usually preferable to locate the thermionic cathodes within the anodes so that the nuclear fuel material may be concentrated within the cathodes and spaced from the reactor coolant so as to provide a relatively steep cathode-anode temperature gradient. The resulting arrangement is then described as a thermionic nuclear energy conversion (fuel) element and this element can be employed with other such elements (and if desired other conventional nuclear fuel elements) in forming an array of relatively stationary fuel elements in the reactive region of a nuclear reactor. Anode cooling is then provided by the selected reactor coolant (either gaseous or liquid) and suitable interconnections are made among the various thermionic nuclear fuel elements to provide an output of generated thermionic power.

One or more of the fissionable isotopes U233, U235, Pu241 and Pu239 can be incorporated within the fuel material, and a chain reaction is propagated by neutrons during operation of the reactor in a manner now well known or ascertainable from prior patents or other published material. In a conventional reactor, as is the case for a thermionic nuclear reactor, the fuel elements usually are spaced relative to one another within the interior of the reactor so that a coolant fluid such as liquid metal, pressurized water, carbon dioxide, helium or an organic material which is liquid at reactor operating temperatures can be circulated among the fuel elements. If the coolant is water or an organic material, it can also serve as the reactor moderator for slowing generated neutrons to thermal or fission producing velocities. High diode operating temperature may require the use of liquid metal such as sodium or lithium in fast reactor applications, and if this is so fuel loading can be relatively increased to account for the lower moderating capability.

The reactor can be controlled by movable reflectors or by the insertion of control rods or other material, containing neutron absorptive matter, into the reactor in order to maintain the chain reaction at a given power level by the absorption of excess neutron. The operation of a nuclear reactor in more specific respects is widely understood in the nuclear art and accordingly will not be described in any greater detail here but will be considered subsequently only with respect to considerations of the compatibility of the thermionic device with a nuclearly reactive environment. Additional general description of thermionic structure alone or combined with nuclearly reactive structure and the operation thereof can be obtained by reference to Serial No. 158,736, filed on December 12, 1961 by Joseph C. Danko and Peter J. McCoy entitled "Cascaded Thermionic Converter," Patent 3,189,765 issued on June 15, 1965 to Joseph C. Danko and Peter J. McCoy entitled "Combined Thermionic-Thermoelectric Converter," and Patent 3,211,930 issued on October 12, 1965 to J. D. Clement et al., entitled "Thermionic Energy Converter," all of which are assigned to the present assignee.

Whatever cathode heat source is employed, it is for obvious reasons desirable to provide, in addition to the structural character previously described, sound and economic manufacturing method steps for the thermionic energy conversion device. Thus, to a substantial extent, the final thermionic structure can be so arranged as to provide the preferred structural and operational character for the device and yet allow the use of good manufacturing technology. On this basis, it is particularly desirable to integrate the cathode members into a single elongated cathode arrangement for employment with a unitary heat source which then provides heat for all of the cathodes in the electrical series connected diodes. Similarly, the anode members can be integrated into a single elongated anode arrangement for employment with a unitary coolant source. Electrode support and interelectrode heat transfer problems are then limited to respective single electrode members, namely the integrated cathode and anode arrangements. Further, if nuclear fuel is used as a heat source, cladding of the fuel is simplified, or, if some other mechanism such as a heated fluid is contemplated for use as a heat source, channeling or directing the heated medium is facilitated.

Thus, in accordance with the broad principles of the present invention, a thermionic energy conversion element comprises a hollow elongated unitary electrode arrangement disposed within another hollow elongated unitary electrode arrangement to provide electron transport space therebetween. A heat source, or in some applications fissionable or nuclear fuel material, can be suitably disposed for heating one of the electrode arrangements and the other electrode arrangement can be subjected to cooling by a flowing coolant. Means are provided for supporting and accurately spacing or centering the unitary electrode arrangements relative to each other so as to provide good mechanical strength for the thermionic energy conversion element yet so as to restrict the cathode-anode heat transfer rate to a value conducive to relatively efficient operation.

In one embodiment of the invention, the supporting means specifically take the form of a plurality of minute conductive balls which not only restrict the cathode-anode heat transfer rate and provide the necessary mechanical support but also provide for differential longitudinal thermal expansion of the unitary cathode and anode arrangements. Further, the unitary electrode arrangements are so interconnected through the supporting means as to form a series of thermionic diodes in a series power generating circuit and leads or terminals can be employed for extracting generated electric power.

The inner unitary electrode arrangement can be the thermionic cathode arrangement and further can be formed by steps comprising forming an inner elongated cladding member (and cladding nuclear fuel therein if such fuel is used), disposing an insulative layer on the inner cladding member, disposing electron emissive cathode material on the insulative layer, compacting the entire assembly to obtain good bonding among the material layers, laterally notching the cathodic layer to the depth of the insulative layer to produce separate longitudinal cathode segments and filling the cathode notches with insulative material if desired.

Similarly, the outer unitary electrode arrangement can be the thermionic anode arrangement and further can be formed by steps comprising machining a plurality of lateral outwardly facing notches in an elongated cylindrical or tubular member of the anode material at longitudinal intervals which correspond with the cathode notch intervals but which are slightly longitudinally offset therefrom, disposing a thermally conductive but electrically insulative material on the notched member, forming an outer metallic cladding over the outside of the coated anode member, compacting the entire assembly, removing a central portion of the anode member to the lateral dimension of the anode notches to form separate anode segments along the length of the unitary anode arrangement.

The unitary cathode arrangement is inserted within the unitary anode arrangement with conductive supporting means therebetween so as to form a plurality of thermionic diodes in series circuit relation. The thermionic energy conversion element can then be suitably enclosed to seal the interelectrode space and, if used, the nuclear fuel material from the coolant.

Thus, it is an object of the invention to provide a novel and efficient thermionic energy conversion element having a plurality of series-connected thermionic diodes wherein respective cathodes are formed on an elongated unitary member and respective anodes are also formed on an elongated unitary member disposed in spaced relation from the unitary cathode member.

It is another object of the invention to provide a novel and efficient thermionic energy conversion element as described in the first object, wherein good mechanical support is provided for and relatively minimum cathode-anode heat transfer is provided between the unitary cathode and anode arrangements through the use of relatively small supporting conductive members.

A further object of the invention is to provide a novel and efficient thermionic energy conversion element as described in the first two objects, wherein the small supporting conductive members are in the form of conductive balls which establish the series circuit relation of the thermionic diodes and which in addition to providing good electrode support further provide for differential longitudinal thermal expansion of the unitary cathode and anode arrangements.

It is another object of the invention to provide a novel and efficient thermionic energy conversion element as described in any of the first three objects, wherein the unitary cathode arrangement is disposed within the unitary anode arrangement and wherein nuclear fuel acts as a heat source and is in turn disposed within the unitary cathode arrangement.

Another object of the invention is to provide a novel and efficient method for manufacturing a thermionic energy conversion element of the character described in any of the foregoing objects.

These and other objects of the invention will become more apparent upon consideration of the following detailed description along with the attached drawings, in which:

FIGURE 1 shows a broken longitudinal section of a thermionic energy conversion element constructed in accordance with the principles of the invention;

FIG. 2 shows a cross section taken along the reference line II—II of FIG. 1;

FIG. 3 is an enlarged view of a portion of the longitudinal section of FIG. 1 showing a close-up of the interelectrode supporting relationship; and, FIG. 4 shows a broken longitudinal section of another thermionic energy conversion element constructed in accordance with the principles of the invention.

There is shown in FIG. 1 an elongated thermionic energy conversion element 10 comprising an elongated unitary cathode arrangement 12 disposed laterally inwardly of the thermionic energy conversion element 10 for heat delivery from a centrally located heat source 14. The thermionic energy conversion element 10 further comprises an elongated unitary anode arrangement 16 disposed laterally outwardly of the unitary cathode arrangement 12 for collection of electrons emitted by the latter. As already noted, however, in some cases it may be desirable to reverse this cathode-anode geometry.

The unitary cathode arrangement 12 includes a plurality of elongated tubular cathode segments 18 disposed in end-to-end relation and insulatively spaced from each other in the longitudinal direction, if desired by the employment of respective electrically insulative annular rings 20 of predetermined longitudinal extent. Similarly, the unitary anode arrangement 16 includes a plurality of elongated tubular anode segments 22 disposed in end-to-end relation and insulatively spaced from each other in the longitudinal direction, if desired by the employment of respective insulative annular rings 24. Preferably, the cathode and anode segments 18 and 22 are of equal length at operating temperatures and therefore at room temperature the cathode segments 18 can be slightly longer than the anode segments 22. The unitary cathode and anode arrangements 12 and 16 are disposed in concentric relation to each other so that an annular inter-electrode space 26 is formed between the arrangements 12 and 16 and between the cathode segments 18 and the respectively associated anode segments 22 for the transport of cathode emitted electrons therebetween.

In order to provide for the transfer of heat to each of the cathode segments 18 from the heat source 14, the unitary cathode arrangement 12 includes an elongated tubular member 28 on which the cathode segments 18 and insulative rings 20 are disposed with a tubular insulative layer 30 located therebetween. The tubular member 28 is preferably formed from a metallic material which is sufficiently refractory to withstand operational temperatures and further is characterized with such structural properties as to provide the desired or necessary mechanical strength for the unitary cathode arrangement 12. Further, if nuclear fuel is used as the heat source 14, the metallic material for the tubular member 28 preferably is provided with a low neutron absorption cross section. An example of a metallic material which fits both of these specifications is niobium or molybdenum.

The unitary anode arrangement 16 is provided with structure similar to that of the unitary cathode arrangement 12 but it is larger in diameter than the later because of its outer concentric location. Further, the anode segments 22 and the insulative rings 24 are disposed on the inner surface of an elongated tubular cladding member 32 with an elongated tubular insulative layer 34 located therebetween. The tubular insulative layer 34 insulates the respective anode segments 22 from each other while simultaneously providing a path for good heat transfer to the cladding member 32 which in turn has an outer surface for heat transfer to a suitable coolant such as the coolant employed in a nuclear reactor if the heat source 14 is provided in the form of nuclear fuel and the thermionic energy conversion element 10 is disposed in the reactive region of a nuclear reactor. Accordingly, the insulative layer 34 is preferably formed from a material which exhibits good electrically insulative properties yet which simultaneously exhibits good heat conductivity and which, of course, has good stability at the anode operating temperature (as high as 700° C.). An example of such material is beryllia (BeO) or alumina ($Al_2O_3$). The material for the cladding member 32 is preferably metallic to provide mechanical strength for the element 10 and the unitary anode arrangement 16. In addition, the cladding member metallic material should also withstand the anode operating temperature and further should be chemically compatible with the anode coolant. Examples of such materials are niobium, molybdenum and stainless steel.

Respective end plugs 36 and 38 are employed for hermetically sealing the interior of the thermionic energy conversion element 10 and are secured to the cladding member 32 by any suitable means, for example by welding. Each end plug 36 and 38 is provided with an outwardly extending stud 40 which can be used for supporting the thermionic energy conversion element 10 in a vertical position if desired, and further is provided with an inner channel 42 for entry of an anode power lead 44 or a cathode power lead 46. An insulative or ceramic layer 48 and a metallic cladding layer 50 can be interposed between the lead 44 or the lead 46 and the stud 40 in the channel 42. In this manner, the leads 44 and 46 are insulated from the end plugs 36 and 38. An alkali metallic vapor conduit 52 is also suitably secured to the end plug 36 for injection of the vapor into the interelectrode space 26 through plug opening 54. If desired the end plugs 36 and 38 can be formed from the material selected for the cladding member 32.

Support means are provided for retaining the unitary cathode and anode arrangements 12 and 16 in concentric relation with accurate spacing therebetween. Radially opposed but slightly longitudinally offset anode and cathode segments 18 and 22 form respective thermionic diodes or cells and the anode segment 22 of each diode or cell is electrically connected in series with the cathode segment 18 of the next longitudinally adjacent cell. The support means are formed by electrically conductive members 56 which connect an end region 58 of each serially connected cathode segment 18 to an anode end region 60 of the longitudinally adjacent serially connected diode.

Since efficient thermionic performance requires relatively low heat transfer from the unitary cathode arrangement 12 to the unitary anode arrangement 16, it is clear that such efficiency is somewhat inherent in the use of the conductive members 56 as the electrode support means if the heat transfer through the conductive members 56 is restricted to a relatively low value while simultaneously good thermionic series current conduction is provided therethrough. As noted in connection with a similar thermionic energy conversion element disclosed in the aforementioned application of J. D. Clement, the optimum cross sectional area and length to be provided for the conductive members 56 is determined on a balancing basis since the Joule loss due to electric current conduction varies inversely as area and directly as length whereas thermal loss due to heat conduction varies directly as area and inversely as length.

In this case, the conductive members 56 are spherical in shape, but the members 56 need not be separate as they can be integrally provided on either the respective cathode segments 18 or the respective anode segments 22. Of course, members 56 need not be spherical in shape as other shapes, such as cylindrical, can be effective. It is preferred, however, that the conductive members 56 be provided in spherical shape so that assembly of the thermionic energy conversion element 10 is facilitated and further so that differential longitudinal thermal expansion of the unitary cathode and anode arrangements 12 and 16 can take place with relative facility.

Another advantage of providing the conductive members 56 in the form of balls is that the balls 56 can readily be embodied with any desired diameter and therefore the material for the balls 56 can be selected in the perspective of the chosen ball size to produce optimum support, current conduction and heat transfer performance between the cathode and anode arrangements 12 and 16. Oblateness of the balls 56 resulting from their use in the element 10 normally produces variations in these performance factors within a tolerable range.

Each ball 56 is preferably disposed in a hemispherical seat 62 in the associated cathode segment 18 (or anode segment 22 if desired). At least three balls 56 are thus held in circumferentially uniform spaced relation between each cathode segment 18 and the next longitudinally adjacent anode segment 22. A plurality of balls 56 can also be employed to support an end cathode segment 64 relative to an end conductive segment 66 which forms a part of the outer unitary anode arrangement 16. Electrical continuity is then established between the cathode lead 46 and the end cathode 64 through the use of a conductive disc 68 which is secured in conductive relation to the outer conductive segment 66 by any suitable means such as by welding.

Similarly, a plurality of balls 56 can be employed to support, in this case without functioning to conduct current, an end cathode ring 72 relative to an end anode segment 74. Continuity is then established between the anode lead 44 and the end anode segment 74 by means of a conductive disc 76 similar to the conductive disc 68. Conductive securance of the lead 44 or 46 to the conductive disc 76 or 68 can be accomplished by any suitable means, for example by welding or pressure bonding.

The balls 56 can be formed from an electrically conductive refractory material such as molybdenum or tungsten carbide and as such continually provide good centering support for the unitary cathode arrangement 12 relative to the unitary anode arrangement 16. Thus, even if during operation the balls 56 acquire slightly different temperatures, an increase in contact area (and perhaps some oblateness) of the hotter balls 56 results in increased support area therefor and therefore tends to retain concentricity between the anode and cathode arrangements 12 and 16. Furthermore, the balls 56 can roll in the seats 62 to some extent during the warm up period so as to allow for differential thermal expansion of the cathode and anode arrangements 12 and 16, with expansion being distributed over the entire length of the element 10. In fact, the design of the element 10 can be such that differential cathode-anode thermal expansion conforms the anode and cathode arrangements 16 and 12 in inner and outer longitudinal dimensions, respectively, substantially so as to prevent unitary cathode rolling movement during operation.

The heat source 14 is disposed within the unitary cathode arrangement 12 and in this case is provided in the form of fissionable or nuclear fuel. The fuel material can be provided in the form of pellets of uranium dioxide if desired, and such pellets can be conformed in size to the inner diameter of the unitary cathode arrangement 12 (or member 28). After insertion of the fuel pellets in the unitary cathode arrangement 12, respective end plugs 78 can be secured, as by welding, to the tubular member 28 so as to seal the nuclear fuel therein.

In operation, fission heat from the source 14 drives the cathode segments 18 to a temperature of 2000° C. or higher and therefore it is preferred that the cathode be highly refractory as well as electron emissive. Thus, cesium-coated tungsten, tantalum, niobium and rhenium are examples of suitable cathode material. Further, when the heat source 14 is nuclear as in this case, the neutron absorptive property of the cathode and other structural material not previously considered is preferably held relatively low. Beryllia is a good ceramic material on this basis and niobium and molybdenum are good materials on this basis for the cathode segments 18 and the anode segments 22.

Electrically, the thermionic energy conversion device 10 includes a plurality (three shown) of thermionic cells or diodes connected in electrical series. Heat produced by the heat source 14 or by nuclear fuel or fissile material forming the heat source 14 is conducted to the cathode segments 18 so as to induce electron emission therefrom. By "fissile" material it is meant that the material is either "fertile" or fissionable and by "fertile" it is meant that the material is susceptible to transformation into a fissionable material by means of neutron flux.

Cooling is provided outwardly of the cladding member 32 and therefore a relatively high temperature gradient appears across the respective cathode segments 18 and anode segments 22 of the various diodes so as to provide for electron transport across the respectively associated longitudinal portions of the interelectrode space 22 from the cathode segments 18 to the associated anode segments 22. Further, the use of cesium or other alkali metal vapor reduces the electron space charge in the interelectrode space 26 so as to enhance the electron transport process.

Since the thermionic cells or diodes are series connected in the manner previously described, the generated voltages of these cells are additive, that is the voltage produced in the left-most thermionic cell adds to the voltage produced in the thermionic cell located adjacent thereto and so forth. The thermionic energy conversion element 10 can be employed with other such elements or with other conventional nuclear fuel elements to form the reactive region of a nuclear reactor and suitable connection can then be made with the power leads 44 and 46 so as to provide for external delivery of generated thermionic power.

In order to manufacture the thermionic energy conversion element 10 of FIG. 1, it is first necessary to prepare the fissile material if such is to be used and it can be prepared in accordance with ordinary methods, such as by compaction of uranium dioxide into pellets suitably sized for insertion in the tubular member 28. Once the nuclear fuel is positioned within the tubular member 28, the end plugs 78 can then be secured to the tubular member 28. The insulative layer 30 can then be disposed on the tubular member 28 by suitable means such as by spraying. The sub-combination so far prepared can then be clad with cathode material either by spraying or by fitting the sub-combination into a close fitting tube of the cathode material. The entire assembly can then be compacted in order to obtain good bonding among all of the material layers. As an example, compaction can be accomplished by swaging or by the use of reducing dies. The cathode material can then be machined to size and grooved circumferentially to the depth of the insulative layer 30, and if the insulative rings 20 are employed the resulting grooves can be filled with the employed insulative material to form the ring 20.

In order to form the unitary anode arrangement 16, a cylindrical member or solid rod or a thick walled tube of the anode material can be grooved through the outer surface thereof at predetermined locations which correspond with the annular insulative anode rings 24 and the selected insulative material can be disposed (as by spraying) in the resulting grooves and over the outer surface cylindrical member to form the insulative rings 24 and the layer 34 respectively. The outer cladding member 32 is then disposed over the outside of the coated anode, for example by means of a slide fit. The resulting assembly is compacted and the interior of the solid rod or thick walled tube is removed by boring or drilling or the like to the inmost radial extent of the insulative rings 20 so that the separate anode segments 22 are exposed to the interior.

The unitary cathode arrangement 12 having the outwardly facing cathode segments 18 is then inserted along with the balls 56 within the unitary anode arrangement 16 having the inwardly facing anode segments 22, and this step is relatively facilitated at room or other low temperature since a good rolling or sliding fit can be obtained at such temperature. The conductive rings 68 and 76 and the end plugs 38 and 36 are then secured to the anode arrangement 16 and outer cladding member 32, respectively, with the leads 44 and 46 being connected as previously described. The fact that the hotter cathode expands more than the anode ensures good structural rigidity and good contact pressure. If it is desired to form a thermionic energy conversion element having a cathode-anode geometry reversed from that just described, a corresponding interchange of method steps can be employed for the manufacture of such an element.

The following design and performance data are presented to demonstrate the results obtained with an exemplary series thermionic combination for use in a thermionic energy conversion element constructed in accordance with the principles of the invention:

Material and structural data:
  Outer anode cladding ___ Mo
  Anode insulation _____ Al$_2$O$_3$
  Anode _____ Mo (10 cm.$^2$ active area)
  Cathode _____ Mo (10 cm.$^2$ active area)
  Cathode insulation _____ Al$_2$O$_3$
  Inner cathode cladding __ Mo
  Balls _____ Nb (.0156 in. diameter)
  Anode-cathode spacing _ .005 in.

Performance data:
  Cathode temperature _____ 1950° K.
  Anode temperature _____ 785° K.
  Cesium bath temperature _____ 525° K.
  Generated voltage _____ 1.25 v. D.C.
  Generated current _____ 13.3 amps
  Generated power _____ 16.6 watts
  Power efficiency _____ approx. 10%

In FIG. 4, there is shown a thermionic energy conversion element 80 which is similar to the thermionic energy conversion element 10 except that it is adapted for general usage with various heat sources. Accordingly, an inner tubular member 82 of a unitary cathode arrangement 84, corresponding to the tubular member 28 and unitary cathode arrangement 12 respectively of the thermionic energy conversion element 10, are provided along the entire length of the thermionic element 80 so that a heated medium, such as a hot fluid, can flow through the open ends of the tubular member 82. Further, a bellow assembly 86 is suitably provided adjacent one end of the thermionic energy conversion element 80 so as to provide for differential cathode-anode expansion. Output leads 88 and 90 are respectively conductively secured to an end anode segment 92 and an end outer conductive segment 94 which is electrically continuous with an end cathode segment 96 through a plurality of balls 56. The balls 56 again in this case provide for mechanical support of the unitary cathode arrangement 84 concentrically within a unitary anode arrangement 91 and simultaneously provide for series current conduction through the various electrically series connected thermionic diodes while relatively minimizing cathode-anode heat transfer.

The foregoing description, including the design and performance data, has been set forth only for the purpose of illustrating an exemplary application of the invention. Accordingly, it is desired that the invention be not limited by the embodiments described, but, rather, that it be accorded an interpretation consistent with the scope and spirit of its broad principles.

What is claimed is:

1. A thermionic energy conversion element comprising an elongated unitary and tubular heatable cathode arrangement and an elongated unitary and tubular coolable anode arrangement spaced concentrically from said cathode arrangement, each of said arrangements having longitudinally spaced longitudinal tubular segments, the cathode segments being electron emissive and being radially opposed to but slightly longitudinally offset from the respective anode segments so as to form respective thermionic diodes, the longitudinal segments of one of said arrangements being outwardly disposed on an elongated tubular member with an electrically insulative tubular layer therebetween, the longitudinal segments of the other arrangement being inwardly disposed on an elongated tubular cladding member with another tubular electrically insulative layer therebetween, means for supporting said cathode and anode arrangements relative to each other and for connecting said diodes in electrical series, and end means for hermetically sealing from the exterior at least the interelectrode space between said arrangements.

2. A thermionic energy conversion element as set forth in claim 1 wherein said cathode arrangement is disposed concentrically within said anode arrangement.

3. A thermionic energy conversion element as set forth in claim 1 wherein said cathode arrangement is disposed concentrically within said anode arrangement, said end sealing means additionally hermetically sealing said cathode arrangement from the exterior, and wherein fissile material is clad as a cathode heat source within the tubular member of said cathode arrangement.

4. A thermionic energy conversion element as set forth in claim 1 wherein insulative material is disposed in the space between each longitudinally adjacent pair of cathode segments and in the space between each longitudinally adjacent pair of anode segments.

5. A thermionic energy conversion element as set forth in claim 1 wherein said cathode arrangement is disposed concentrically within said anode arrangement, said end sealing means additionally hermetically seal said cathode arrangement from the exterior, wherein fissile material is clad as a cathode heat source within the tubular member of said cathode arrangement and a conductive disc is supported in conductive relation to each end segment formed from said cylindrical member and wherein respective anode and cathode leads are attached thereto and extended to the exterior through said end sealing means.

6. A thermionic energy conversion element comprising an elongated unitary and tubular heatable cathode arrangement and an elongated unitary and tubular coolable anode arrangement spaced concentrically from said cathode arrangement, each of said arrangements having longitudinally spaced longitudinal tubular segments, the cathode segments being electron emissive and being radially opposed to but slightly longitudinally offset from the respective anode segments so as to form respective thermionic diodes, the longitudinal segments of one of said arrangements being outwardly disposed on an elongated tubular member with an electrically insulative tubular layer therebetween, the longitudinal segments of the other arrangement being inwardly disposed on an elongated tubular cladding member with another tubular electrically insulative layer therebetween, end means for hermetically sealing from the exterior at least the interelectrode space between said arrangements, and a plurality of circumferentially spaced electrically conductive members supporting an end region of each cathode segment relative to an opposed end region of the next longitudinally adjacent anode segment.

7. A thermionic energy conversion element as set forth in claim 6 wherein said conductive members are in the form of refractory electrically conductive balls and each of said balls is provided with a seat in one of the two segments supported by such ball.

8. A thermionic energy conversion element as set forth in claim 6 wherein said cathode arrangement is disposed concentrically within said anode arrangement, said end sealing means additionally hermetically seal said cathode arrangement from the exterior, and wherein fissile material is clad as a cathode heat source within the tubular member of said cathode arrangement.

9. A thermionic energy conversion element as set forth in claim 6 wherein said cathode arrangement is disposed concentrically within said anode arrangement, said end sealing means additionally hermetically sealing said cathode arrangement from the exterior, wherein fissile material is clad as a cathode heat source within the tubular member of said cathode arrangement, wherein insulative material is disposed in the space between each longitudinally adjacent pair of cathode segments and in the space between each longitudinally adjacent pair of anode segments, and wherein said conductive members are in the form of refractory electrically conductive balls and each of said balls being provided with a seat in one of the two segments supported by such ball.

References Cited by the Examiner

UNITED STATES PATENTS

| | | | |
|---|---|---|---|
| 3,137,799 | 6/1964 | O'Connor | 310—4 |
| 3,138,725 | 6/1964 | Houston | 310—4 |
| 3,139,667 | 7/1964 | Knauf | 29—155.5 |
| 3,149,407 | 9/1964 | Stockton | 29—155.5 |

MILTON O. HIRSHFIELD, *Primary Examiner.*

J. W. GIBBS, *Assistant Examiner.*